United States Patent [19]

Ball

[11] Patent Number: 6,014,949
[45] Date of Patent: Jan. 18, 2000

[54] PRECONDITIONED AIR DELIVERY MANIFOLD SYSTEM FOR DOG HOUSES

[75] Inventor: Daniel W. Ball, Houston, Tex.

[73] Assignee: Daniel Ball, Houston, Tex.

[21] Appl. No.: 08/943,974

[22] Filed: Oct. 7, 1997

[51] Int. Cl.$^7$ ................................................ F24F 3/044
[52] U.S. Cl. .......................................... 119/484; 119/500
[58] Field of Search ................................. 119/486, 500, 119/484; 454/200, 208, 210

[56] References Cited

U.S. PATENT DOCUMENTS

| | | |
|---|---|---|
| 3,962,994 | 6/1976 | Petrucciani . |
| 4,021,975 | 5/1977 | Calkines . |
| 5,809,936 | 9/1998 | Wall .................................. 119/486 X |

Primary Examiner—Harold Joyce
Attorney, Agent, or Firm—Wendy K. Buskop; Bayko Gibson et al

[57] ABSTRACT

A precondition air delivery system for dog houses usable in a house window for flowing air from a human's house to a dog house comprising a port in the window of the human house with tubing connecting the port to the dog house; a damper on the intake side of the port to regulate the amount of air flow from the house; an electric fan attached to the exhaust side of the port to cause air to flow from the human house through the damper, through the port, through the tubing, and into the dog house; a cam attached to the damper enabling a microswitch to engage the electric fan when the damper is adjusted to regulate the amount of air flow from the human house to the dog house; a bug screen attached to the damper to prevent bugs from freely moving through the tubing from the dog house to the human house.

8 Claims, 2 Drawing Sheets

PRECONDITIONED AIR DELIVERY MANIFOLD SYSTEM FOR DOG HOUSES

BACKGROUND OF THE INVENTION

This invention relates to heating and air conditioning dog houses.

A method for transferring preconditioned air from human domicile to dog house. The average dog house has a floor, roof and four walls. There is an opening in one end for entry. Dog houses are generally positioned in the back yard of the owners home. They are too hot or cold, stuffy and damp, therefore are seldom used. Geographically transplanted animals suffer most. (Such as Alaskan Huskies in Houston Tex.). It is not always convenient to have your animal in the house. Even letting them in and out can sometimes be dangerous. (We forget!) There are also many diseases and parasites associated with lying on the open ground. A climate controlled, guilt free, safe house on the outside of the home that would always be accessible to the animal would be highly desirable to both pet and owner. The most common reason, (according to the Houston S.P.C.A.), for people abandoning their pets is, "I can't have them in the house and can't stand to see them suffer."

OBJECTS OF THE INVENTION

It is an object of the present invention to provide, accessible to the animal, safe and comfortable space on the outside of the existing home, with a climate basically matching that inside the home.

SUMMARY OF THE INVENTION

In one embodiment of the invention there is provided a manifold box that has an intake and an exhaust. The manifold box has a bottom, top and four sides. It has a snout designed to pass through a slightly open window. There is a flap attached to the innermost portion of the snout to allow air flow when open and seal when shut. The flap also has a short rod attached in such a way as to make and unmake a micro switch turning the box fan on when open and off when shut. There is a box fan. 12 volt, 24 volt or 110 volt can be used. The box fan is mounted at the exhaust at the outer most inside portion of the manifold box. There is a micro switch positioned on the floor of the box adjacent to the wall in relation to the micro switch rod on the flap. There is a fine mesh wire bug screen inserted and removable at the inside portion of the snout. There is a two inch tube protruding out from the outermost portion of the manifold box as a joining coupler for flex hose.

In another embodiment there is provided a rectangular length of weather resistant foam rubber. There is a rectangular hole cut in one end and center of a size convenient to slip the snout through. The weatherstripping is of a length greater than the majority of window openings. The weatherstripping is made too long so that it may be trimmed to fit exact and weather tight.

In yet another embodiment there is provided two metal wedges with rubber feet, compressible for easy removal. When the weatherstripping collar is installed around the manifold box snout and across the space of the open window the window can be closed tightly on the weatherstripping and the window wedges inserted at either side at the top of the window. Thus finishing with a secure window.

In still another embodiment the preconditioned air is passed through a flex hose attached with couplers from the pipe at the back of the manifold box to one of the side walls of the dog house. A refrigeration curtain of clear plastic strips should be installed over the entry opening of the dog house. Thus allowing the animal to see outside, come and go, and still retain most of the preconditioned air.

DETAILED DESCRIPTION OF THE PREFERRED EMBODIMENTS

Figure 1:
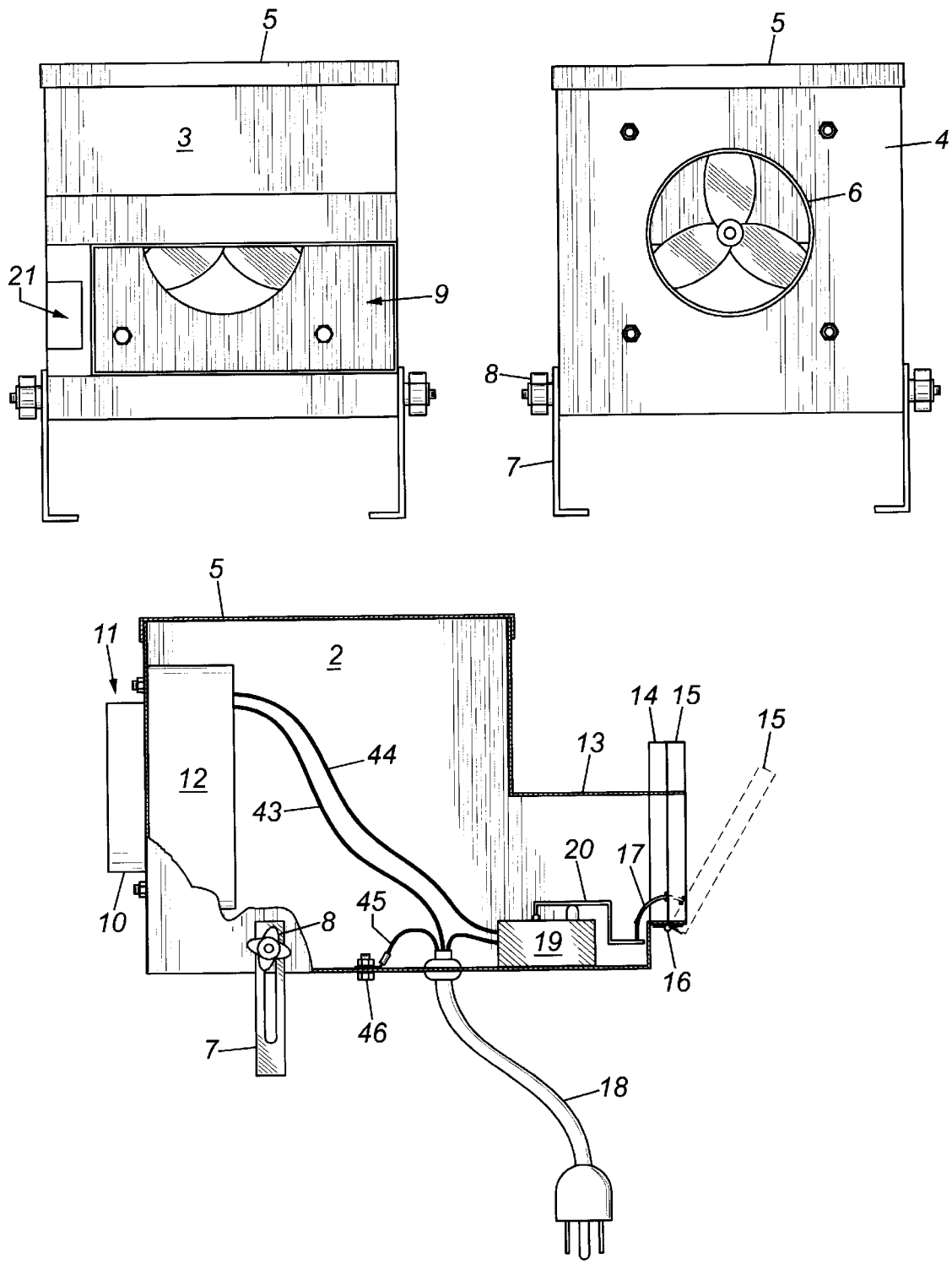
FIG. 1 is a plan view of the system front, back, top section and cut away side, exposing inner workings with flap open and shut.
Figure 2:
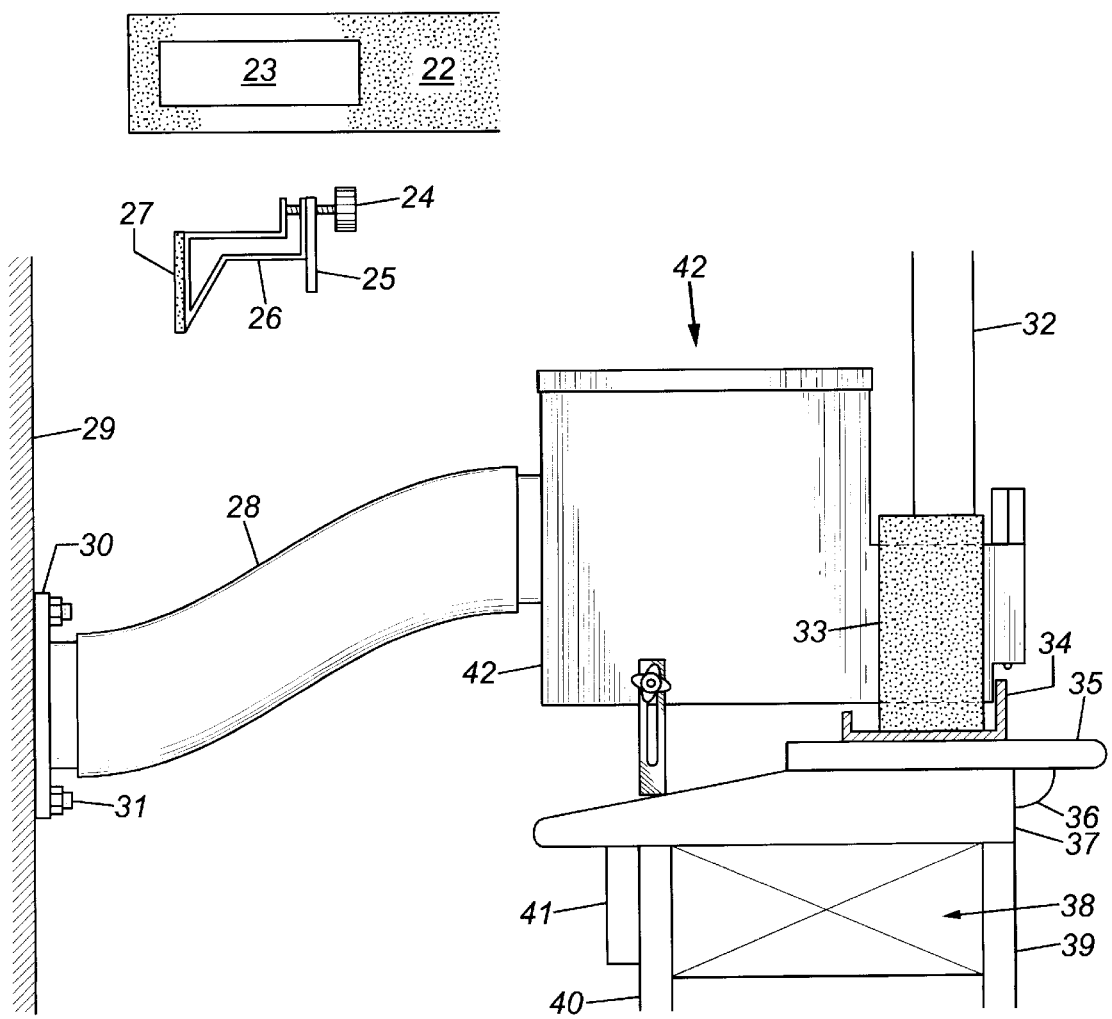
FIG. 2 is a plan view of the system installed in a typical vertical motion residential window.

In one embodiment of the present invention there is provided a preconditioned air delivery manifold system for dog houses. This attaches safely and securely in a slightly open window without major refurbishing of the home or climate unit. The system comprises a manifold box 42, with intake port 9, an exhaust port 6, an electric power source 18, a box fan and motor 12, a micro-switch 19, a micro switch trip lever 20, a micro-switch trip lever rod 17, a flap 15, and two stabilizer legs 7. The manifold box 42 has a top 5, front 3, back 4, two sides 2, a bottom 43, an intake port 9, and exhaust port 6. Inside the manifold box 42, there is a box fan and motor 12 positioned against the back wall 4 inside directly over the exhaust port 6, there is a positive power source lead wire 43 and a return power source lead wire 44 connected to the terminals provided on back of the box fan and motor 12. The positive power source lead wire 43 attached on one end to terminal on back of box fan and motor 12 and the other end to the power source 18. The return power source lead wire 44 attached to the terminal on back of the box fan and motor 12 and the other end attached to one terminal provided at the back of micro-switch 19. The other terminal at the back of micro-switch 19 has attached return power source wire included in power source wire 18. Power source 18 also has a power source ground wire 45 attached to ground screw 46 attached to manifold box 42. Micro switch 19 a micro switch trip lever 20 that protrudes toward the intake 9 and directly under the flap 14 driven micro-switch trip lever rod 17. The trip lever rod 17 is attached to the flap 15 in such a way that when the flap 14 is closed the trip lever rod 17 presses on the micro switch trip lever 20 in a downward motion thus unmaking the conductors in the micro-switch 19. The off position. When flap 15 is in the open position the trip lever rod 17 rotates in an upward motion releasing pressure on the spring loaded micro-switch trip lever 20 thus making the conductors in micro-switch 19 the on position. Current is passed through the box fan and motor 12 rotating the fan blades in a direction so as to draw air into the intake 9 and out the exhaust 6.

In a preferred embodiment, the flap 15 works as a hatch opening and closing intake port 9 to effectively seal out air coming and going to stop foul backwash from the dog house. The flap 15 also rotates the trip lever switch rod 17. So that anytime the flap 15 is open the fan and motor 12 are turning to insure correct direction of air flow.

In another embodiment there is provided a wire mesh bug screen 14 located at the front most portion of snout 13 and behind flap 15. This wire mesh bug screen 14 is of hole size at least as fine as a typical window screen. Thus not allowing pests access to the inside of the house.

In yet another embodiment there is provided a method for installing this preconditioned air delivery manifold system for dog houses 42 into a slightly open window and effectively sealing out the elements by use of the weather stripping collar 22. When installed around the snout 13 and positioned into the window opening and cut to proper length. The weather stripping collar 22 and manifold box snout 13 full the window frame opening side to side and top to bottom evenly. So that when the window is closed down onto weatherstripping collar 22 and manifold box 42 they form a weather tight unit.

In still another embodiment there is provided a compressible window locking wedge assembly with thumb screw 26. For any typical window to move there must be sidewall clearance. The window locking wedge assembly 26 inserts into the sidewall clearance at the two uppermost corner portions of the moving panel. The main body of the wedge 26 inserts into the crack, neoprene foot portion 27 against the stationary window frame. Wedge expanding thumb screw 24 in the screwed out position relaxing wedge. Pressed in a downward motion until window contact torque leg 25 makes contact 6 with the top of the moving panel of the window. Thumb screw 24 then tightened will securely lock the window panel in position.

In an embodiment of the existing invention there is provided a method for installing manifold box 42 and weather stripping collar 22 also for use in horizontal sliding windows. Rotate manifold box 42 and weather stripping collar 22 ninety degrees. This system is designed for use equal in vertical or horizontal sliding windows. All parts work the same.

The box 42, front flap 15, and the exhaust port tube 10 can be made of any suitable rigid material that is water resistant such as plexiglass, fiberglass, metal, plastic, (P.V.C.) Poly Vinyl Chloride or any other suitable water resistant material.

EXAMPLE

The preconditioned air delivery manifold system for dog houses described above can be installed in any conventional vertical or horizontal sliding type residential window. This system is designed to work well tip side up or either side up. The configuration of the weather stripping collar and manifold box work in harmony with most all windows. The wedge locks add safety and security to the necessity of compressing and locking in place the moving panel against the weather stripping. When the flap is open and the box fan and motor are rotating the drawn air in conjunction with normal compressed air escaping from the house. Provides ample preconditioned air to heat or cool the dog house. As required by the government all heating and cooling systems must vent a certain amount of stale air periodically. Why not use it for the comfort of your pet?

Optionally, the preconditioned air delivery manifold system may be used to heat and cool a small outside green house for plants.

What is claimed is:

1. A preconditioned air delivery system for dog houses usable in a house window for flowing air from a human's house to a dog house comprising:

a weather stripping means detachably attached in a house window further having a port having a first side being an intake side and a second side being an exhaust side;

tubing attached to said intake side of said port and said exhaust side of said port and wherein said tubing attached to said exhaust side of said port is further connected to a dog house;

damping means connected to said intake side of said port to regulate the amount of air flow from said human house through said intake side of said port and connected to said tubing;

a electric fan attached to said exhaust side of said port to cause air to flow through said damping means and into said intake side of said port, through said port, and into the exhaust side of said port and further into said tubing which is connected to said dog house;

cam means attached to the damping means enabling a microswitch to engage said electric fan when said damping means is adjusted to regulate the amount of air flow from said human house to said dog house;

electrical connecting means disposed in said tubing connecting said microswitch and said electric fan to a power source;

a bug screen attached to said damping means to prevent bugs from freely moving through the tubing from said dog house to said human house.

2. The system of claim 1 further comprising at least one clip for removably locking said house window securely in place.

3. The system of claim 1 wherein said fan is 12 volt DC having 0.13 amps.

4. The system of claim 1 wherein said tubing is flexible duct tube.

5. The system of claim 2, wherein said clips are compressible wedge window locks that securely hold the moving portion of the window locked in a partially open position.

6. The system of claim 1, wherein said bug screen is an air filter.

7. The system of claim 1, wherein said bug screen is removable.

8. The system of claim 1, wherein said damping means and said microswitch are thermostatically controlled.

* * * * *